UNITED STATES PATENT OFFICE.

WALTER G. CLARK, OF NEW YORK, N. Y., ASSIGNOR TO PARKER-CLARK ELECTRIC COMPANY, OF JERSEY CITY, NEW JERSEY, A CORPORATION OF NEW JERSEY.

COMPOSITION OF MATTER FOR ELECTRIC CONDUCTORS.

No. 821,017.   Specification of Letters Patent.   Patented May 22, 1906.

Application filed January 24, 1906. Serial No. 297,638.

*To all whom it may concern:*

Be it known that I, WALTER G. CLARK, of the city, county, and State of New York, have invented a new and Improved Composition of Matter for Electric Conductors, of which the following is a full, clear, and exact description.

My invention relates to improvements in refractory conductors such as are suitable for films or filaments in electric lamps.

The object of my invention is to produce a refractory conducting material which can be applied to the inner walls of a non-conducting refractory tube as a film or lining or used as a filament for the common type of incandescent electric lamp and which will be harder and more durable than the carbon films or filaments in their various forms or combinations.

My invention is also intended to produce a composition which has the property of being a good conductor when cold and which has a less variable conductivity under temperature variations than most refractory and high-resisting conductors. I have found that by effecting a combination of carbon and silicon in either the form of a film or filament, as stated, I attain the desired result, and, as stated below, I can make the composition in a very simple manner, so as to produce a structure harder and better adapted for lighting purposes than the usual forms of carbon.

With these ends in view my invention consists of a composition of matter containing carbon and silicon which will be hereinafter fully described and claimed.

In carrying out my invention I do not limit myself to any precise proportions of silicon and carbon nor to any particular means of effecting the combination of the two, as I find that by several processes a combination is effected and a composition produced which is essentially different from either the carbon or silicon or carborundum. The combination is produced by decomposing compounds containing carbon together with compounds containing silicon and bringing about a combination between the carbon and silicon which seems to be a chemical combination, though perhaps it might be an intimate mechanical mixture, or a combination can be produced by heating or otherwise decomposing carbon in the presence of a compound containing silicon either in gaseous, solid, or fluid form or by heating or otherwise decomposing silicon in the presence of a carbonaceous compound which may be either gaseous, fluid, or solid. The combination may also be effected by directly combining silicon and carbon by means of heat or by electric current or by the application of both heat and the electric current.

One way of producing the composition is by subjecting to heat graphitic or other form of pure carbon mingled with either graphitic or crystalline form of silicon. The combination is thus effected which differs from either the silicon or carbon or from the combination of carbon and silicon known as "carborundum," and my combination is produced at a very much lower temperature. Another way to produce the combination is by decomposing a carbonaceous gas together with the vapor from a volatile silicon compound such as vapor of silicon tetrachlorid. This brings about a combinationn between the carbon and the silicon differing from either of the constituents and producing a hard solid substance softer than the carborundum or silicon, but considerably harder than any form of carbon except the crystalline form. The combination thus produced seems to be chemical, and this process just described of making it from carbonaceous gas and a volatile silicon compound is a very satisfactory one. This compound is a good conductor of electricity at ordinary temperatures, thereby differing from carborundum, which is a good conductor only when heated to a very high temperature and is a bad conductor when cold. Moreover, carborundum as heretofore made cannot be controlled during its process of manufacture with sufficient nicety to produce effective filaments or tube-linings. Another example: By decomposing, by means of heat or otherwise, the vapor of silicon tetrachlorid or other silicon compound in the presence of carbon, such as the filament of an incandescent lamp, a combination between the silicon and carbon is effected the same as described above, or by decomposing a carbonaceous compound, such as a hydrocarbon gas, in the presence of silicon, either graphitic or crystalline, a combination is effected between the two, bringing about a result such as described above. As a special means of bringing about the combination of silicon and carbon for the purpose of increasing the strength, efficiency, and otherwise improving incandescent electric-lamp filaments the filaments may be heated in the presence of a mixture composed of a volatile carbonaceous compound together with a volatile silicon compound. For instance, the filament can be heated by passing an electric current through it in the presence of a mixture of hydrocarbon gas and the vapor of silicon tetrachlorid. In such case the combination is made as above stated and the desired result is obtained.

I have set forth above several examples of the way in which this combination of carbon and silicon can be brought about to show that the invention is not limited to any particular process and that the result which I claim as my invention can be produced in many practical ways.

While carborundum is a combination of carbon and silicon, it is effected at practically the heat of the electric arc and at the fusing-point of carborundum, and the result is a crystalline product. It is not a good conductor of electricity at ordinary temperatures; but the combination of carbon and silicon which I make is produced at a comparatively low temperature, and the resulting product has characteristics entirely different from carborundum, and especially and essentially in that the product is when cold a conductor of electricity and is a smooth fine non-crystalline product. The composition is also a dense non-porous one, making it suitable for an electric conductor.

Having thus fully described my invention, I claim as new and desire to secure by Letters Patent—

1. The herein-described composition of matter consisting of a dense non-porous and non-crystalline combination of silicon and carbon.

2. The herein-described composition of matter consisting of a dense non-porous and non-crystalline combination of silicon and carbon produced below the fusing-point of carborundum.

3. A composition of matter consisting of a combination of carbon and silicon less hard than carborundum produced by decomposing gaseous compounds of carbon and volatile compounds of silicon in the presence of each other.

4. The herein-described composition of matter consisting of a combination of carbon and silicon less hard than carborundum which is produced at a temperature less than that required to fuse carborundum and is a conductor of electricity when cold.

5. The herein-described composition of matter consisting of a combination of carbon and silicon less hard than carborundum produced by decomposing a carbonaceous gas in the presence of a volatile silicon compound.

WALTER G. CLARK.

Witnesses:
  WARREN B. HUTCHINSON,
  WILLIS A. BARNES.